United States Patent

[11] 3,598,908

[72] Inventor Anthony Poulett
Redwood City, Calif.
[21] Appl. No. 756,533
[22] Filed Aug. 30, 1968
[45] Patented Aug. 10, 1971
[73] Assignee Ampex Corporation
Redwood City, Calif.

[54] DIGITALLY CONTROLLED LAP DISSOLVER
23 Claims, 5 Drawing Figs.

[52] U.S. Cl. 178/6, 178/7.1, 307/251, 328/104, 328/156
[51] Int. Cl. H04n 5/22
[50] Field of Search 178/DIG. 6, 7.1; 328/104, 137, 152, 154, 156; 330/30, 124; 307/251, 304

[56] References Cited

UNITED STATES PATENTS

| | | | |
|---|---|---|---|
| 2,193,869 | 3/1940 | Goldsmith | 178/DIG. 6 |
| 2,653,186 | 9/1953 | Hurford | 178/DIG. 6 |
| 3,260,954 | 7/1966 | Thompson | 330/124 |
| 3,371,160 | 2/1968 | Hurford | 328/104 |
| 3,374,119 | 3/1968 | Legler | 178/7.1 |

OTHER REFERENCES

Jorgensen - LAP-Dissolve Amplifier for TV Broadcasting, June 1964 - RCA Engineer - Vol. 10 #1 pp. 66, 67

*Primary Examiner*—Robert L. Griffin
*Assistant Examiner*—Joseph A. Orsino, Jr.
*Attorney*—Robert G. Clay

ABSTRACT: A dissolver network for video signals adapted to receive two input video signals and provide a dissolved video output signal. Attenuating networks, responsive to digital signals, control the proportion of each video input signal dissolved at various steps in the dissolve. The attenuator networks are controlled by an up-down binary counter to correspondingly increase the signal level of one input while reducing the signal level of the other as the counter counts up; and as the counter counts down, decrease the signal level of said one input signal while correspondingly increasing the level of said other signal. The counter may be clocked responsive to the vertical sync reference of the video signals.

INVENTOR.
ANTHONY POULETT
BY Thomas C. Schatzel
ATTORNEY

INVENTOR.
ANTHONY POULETT

BY Thomas C. Schatzel

ATTORNEY

INVENTOR.
ANTHONY POULETT
BY Thomas E. Schatzel
ATTORNEY

INVENTOR.
ANTHONY POULETT

BY Thomas E. Schatzel

ATTORNEY

DIGITALLY CONTROLLED LAP DISSOLVER

BACKGROUND OF THE INVENTION

The present invention relates to the editing of video signals and, more particularly, to dissolving one video signal in the place of another.

Dissolving of video signals is a highly desired feature in the television broadcasting and video tape recording arts. The prior art includes dissolver systems in which it is necessary to mechanically control a variable resistance receiving the two video signals to alter the ratio of one video signal to the other. Such systems do not readily lend themselves to automation or remote control. Furthermore, due to numerous variables, e.g. nonuniformities in the variable resistance, variations in the controller, etc., the dissolve may not be uniform throughout. For example, in making a dissolve of signal A to signal B, it is desirable to uniformly decrease A while increasing B at the same rate. Ideally, the percentage of A and percentage of B should always equal 100. However, due to the nonuniformities the ideal is not easily realized.

The present invention provides an automated dissolver system in which the start of the dissolve operation may be controlled by command signals from a position remote in relationship to the video signals. This lends to the physical placement of the processing equipment to an area remote from the actual control panel where the dissolve operation may be selected. Once started, the dissolve is completed automatically. The system further lends itself to an instantaneous cut or a dissolve time rate selected to one of various values, which rate may be selected at the remote location. The system further lends itself to incorporation of uniform fixed components such that the ideal condition of the percentage of the video signals at all points during the dissolve is more nearly realized than heretofore. The system, being capable of remote control and responsive to digital signals, further lends itself to programmed control.

SUMMARY OF THE INVENTION

The present dissolver includes a pair of attenuator networks each having a plurality of selectable paths of unique attenuation value between its input and output. Each path includes a control switch capable of assuming a conductive or a nonconductive state responsive to electrical drive signals. Depending on which switches, individually or in combination, are in the conductive state, the degree of attenuation varies. The attenuators are each controlled responsive to an up-down binary counter. The counter provides a binary number increasing or decreasing in standard binary counts between the all "0" and all "1" states. The attenuation value of each path is unique and selected so that the attenuation increases or decreases in equal increments responsive to each binary count. The attenuators are further designed such that as the degree of attenuation in one attenuator is increasing the attenuation in the other attenuator is decreasing by a comparable amount, i.e. one attenuator substantially complements the other so that the percentage of one video signal plus the percentage of the other video signal substantially equals 100 percent. A complete dissolve may take place during the time required for the counter to go from the all "0" state to the all "1" state or vice versa. Start of the counter may be controlled by remote commands and once the counter starts, the dissolve is automatically completed. Inhibit means may be included such that where the counter is in the all "0" state or the all "1" state, the counter is stopped. The counter restarts responsive to a remote command. The rate of the dissolve is controllable by the clock signals to the counter. The counter may be clocked in accord with vertical sync pulses on the video signals such that the attenuator network is switching during a vertical pulse interval.

DESCRIPTION OF THE PREFERRED EMBODIMENT

Figure 1:
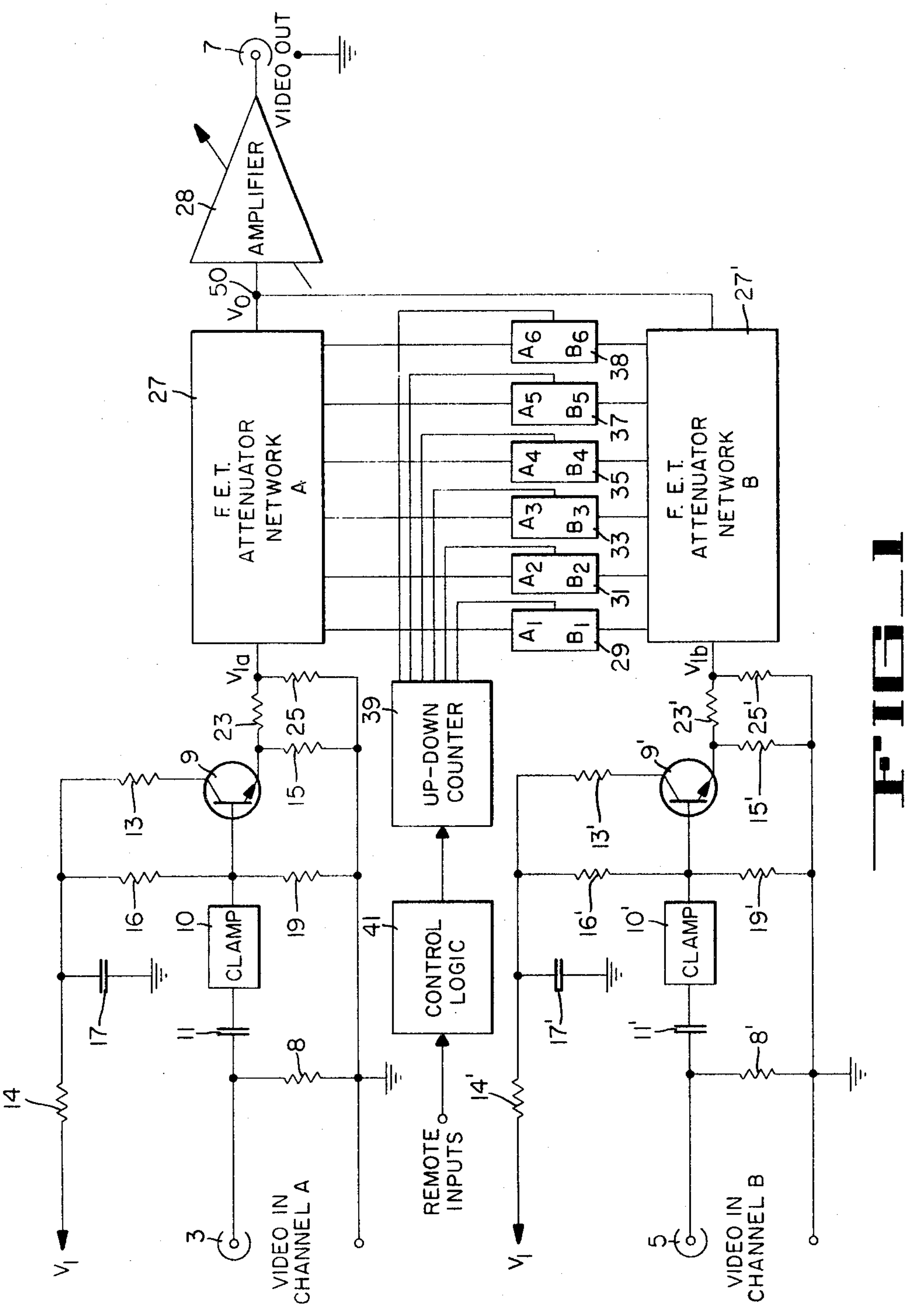
FIG. 1 is a block diagram of a dissolver network in accordance with the present invention.

Referring to the drawings, there is illustrated a dissolver network for practicing the present invention. FIG. 1 illustrates an overall block diagram of such a system. Two input signals, herein referred to as Video In Channel A and Video In Channel B, are received at input terminal means 3 and 5, respectively. The two input signals are dissolved to generate an output video signal at an output terminal means 7 and referred to as Video Out. Each of the terminal means 3, 5 and 7 includes a common ground reference plane. Across the input terminal means 3 is an input terminating resistance 8. One side of the resistor 8 extends to an emitter follower stage including a transistor 9 of which the base extends to the resistor 8 through a clamp network 10 and coupling capacitor 11. The collector extends to a bias potential $V_1$ through a collector resistor 13 and a small resistance 14, and the emitter extends to the ground reference plane through an emitter resistor 15. The base extends to the bias potential $V_1$ through a resistance 16 and the resistance 14. A suppression capacitor 17 extends to the common ground reference plane from the resistors 13 and 16. The base of the transistor 9 also extends to the ground reference plane through an input resistance 19. The emitter follower feeds into a simple attenuator network comprising a pair of resistors 23 and 25 with the resistor 23 common to the emitter of the transistor 9 and the resistor 25 common to the ground reference. It will be noted that the circuitry of Channel B is analogous to that of Channel A. Accordingly, the components of Channel B carry the same reference numerals as Channel A except that the numerals of Channel B are primed. The emitter follower stages are included to provide an input impedance of sufficient value to realize a satisfactory cutoff frequency within industry standards and at the same time allow for a coupling capacitor 11 of reasonable size. The clamp network 10 may be of any well known design adapted to hold the DC reference level at the input of the transistors 9 and 9′ at the same value. For example, the DC value may be selected so that the sync signal of the input video signals is at the black signal level.

The video outputs designated $V_{1a}$ and $V_{1b}$ from the simple attenuators and developed across the resistors 25 and 25′, respectively, are received by a pair of attenuator networks 27 and 27′ each of which contain a plurality of on-off control switches for controlling the degree of attenuation. The individual switches, which may be in the form of field effect transistors, of the network 27 are gated responsive to input drive signals designated $A_1$, $A_2$, $A_3$, $A_4$, $A_5$, $A_6$ and those of the network 27′ are responsive to input drive signals $B_1$, $B_2$, $B_3$, $B_4$, $B_5$, $B_6$. The output of the networks 27 and 27′ are tied in common and amplified by a variable-gain video amplifier 28. The amplifier provides for unity gain of the Video Out with relationship to Video In. The amplifier may be adjusted with one attenuator 27 or 27′ fully on and the other off. The gain may be adjusted upon initial installation or when in the course of maintenance components are replaced. The attenuator networks 27 and 27′ are depicted in greater detail in FIG. 2.

Figure 3:
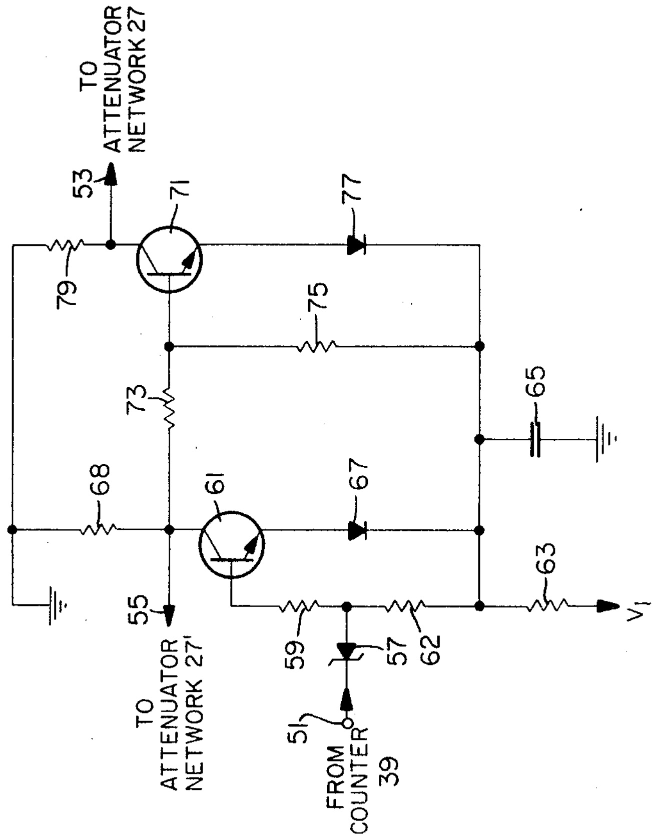
FIG. 3 is a schematic diagram of an attenuator driver for the dissolver network of FIG. 1.

The input drive signals to the attenuator networks 27 and 27′ are in the form of "on-off" signals. These signals in the illustrated embodiment are delivered by an attenuator driver network arrangement. The function of the attenuator driver network is to convert the "0" and "1" bit signals from the counter 39 to a responsive signal sufficient to drive the switches in the attenuator networks 27 and 27′. The attenuator drivers as depicted here comprise a plurality of complementary drivers in which the drive signals from $A_1$ and $B_1$ are received from a common driver 29, the signals for $A_2$ and $B_2$ received from a second driver 31, the signals from the inputs $A_3$ and $B_3$ from a third driver 33, the signals for the inputs $A_4$ and $B_4$ from a driver 35, the signals for the inputs $A_5$ and $B_5$ from a driver 37 and the signals for the inputs $A_6$ and $B_6$ from a driver 38. FIG. 3 illustrates in more detail circuitry for each driver.

Figure 4:
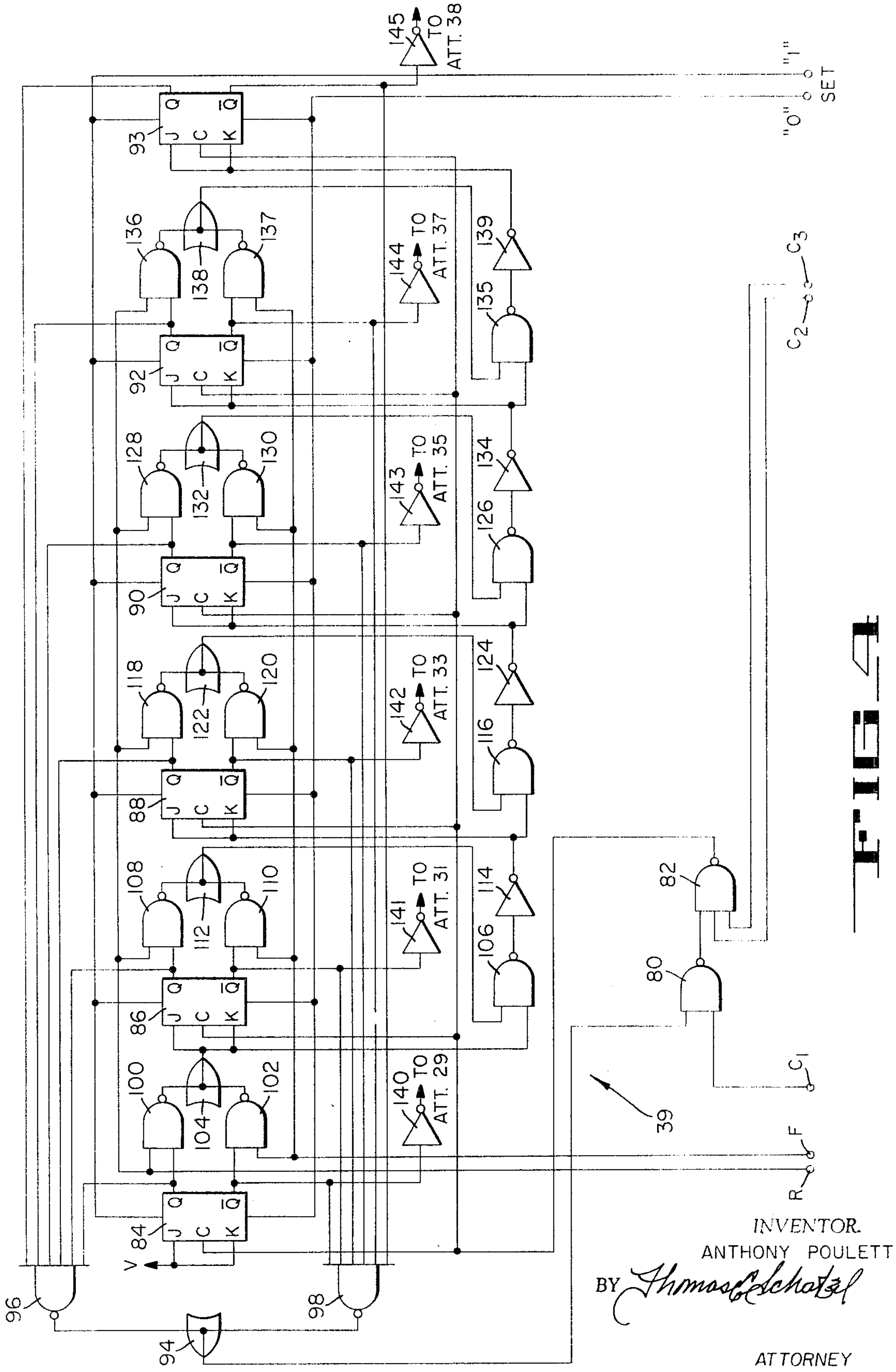
FIG. 4 is a schematic diagram of an up-down counter for the dissolver network of FIG. 1.

The drivers 29, 31, 33, 35, 37 and 38 are each controlled by an up-down (backward-forward) counter network 39 which is depicted in FIG. 4 in substantially greater detail. The counter 39 may be viewed as a standard type capable of counting forward from binary 000000 to binary 111111 and follows the regular binary code. The reverse count starts from binary 111111 and counts back to binary 000000. The start of the counter network 39 is controlled by a control logic network 41 which may be remotely located from the video signals $V_{1a}$ and $V_{1b}$ received at attenuators 27 and 27′.

Figure 2:
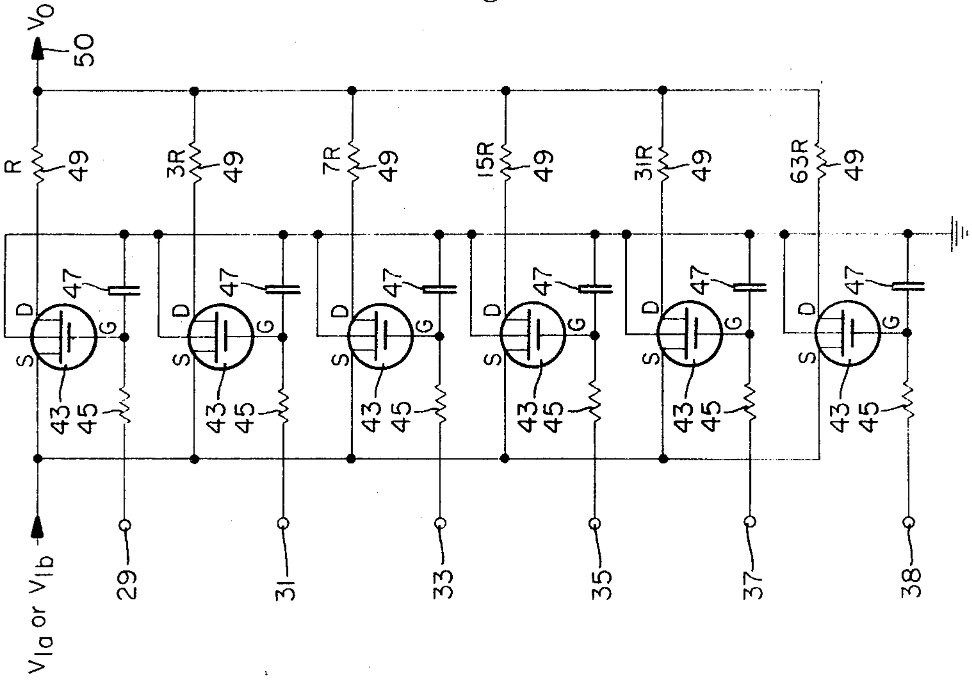
FIG. 2 is a schematic diagram of an attenuator network for the dissolver network of FIG. 1.

Now describing the circuitry of the present system and the theorized mode of operation, reference may be made to FIG. 2. FIG. 2 illustrates an attenuator network 27. The attenuator network 27′ may be identical, and to avoid redundancy only one will be described. The attenuator networks 27 and 27′ include a plurality of individual paths equivalent to the number of bits in the binary code number for controlling the dissolve. In the illustrated embodiment the logic binary number may be presumed to include six digits. Thus, the attenuator network 27 and 27′ each include six individual paths. Each of the six paths extends to one of the attenuator drives 29, 31, 33, 35, 37 and 38. Each includes a switch in the form of a field effect transistor 43. The transistor 43 has a gate electrode G, a sink electrode S and a drain electrode D. The sink electrode S receives the video input signals, $V_{1a}$ or $V_{1b}$. The gate electrodes G receive input drive signals from the associated driver 29—38. The input drive signals to the associated gate electrodes are each passed through an intermediate resistance 45. The gate G of each transistor 43 is further coupled through a suppressing capacitor 47 to the ground reference plane. The drains D of the transistors 43 are each tied through a resistance 49 to an output terminal 50 at which the video output signal, $V_0$, is received by the video amplifier 28. The sink and drain terminals may be interchanged without affecting the circuit operation. The field effect transistors are such that when the voltage on the gate is zero the impedance between the drain and sink is extremely high, e.g. one megohm or so. This may be viewed as the nonconductive or "off" state of the transistor. However, when the proper bias potential is applied, e.g. −12 v. or so, the impedance is reduced to a true value, e.g. 250 ohms, so long as the input voltage remains below the knee voltage. This may be viewed as the "conductive" or "on" state. The value of the resistor 49 in each of the various paths is unique in each attenuator network so that each path offers a different value of attenuation when in the conductive state. The resistors 49 in each attenuator network are selected to be of a ratio in relationship to each other so as to decrease the value of the input signal with relationship to the output signal by fixed degrees as the transistors 43 are switched between the conductive and nonconductive state. For example, the resistors 49 are chosen to have a relationship of R, 3R, 7R, 15R, 31R and 63R such that when the field effect transistor associated with driver 29 switches, the output voltage changes by one-half; when the field effect transistor associated with the driver 31 is switched the output voltage changes by one-fourth, when the field effect transistor 43 associated with the driver 33 is switched the output voltage changes by one-eighth; when the field effect transistor 43 associated with the driver 35 is switched the output voltage changes by one-sixteenth; when the field effect transistor associated with the driver 37 is switched the output changes by one thirty-second and when the field effect transistor associated with the driver 38 is switched the output changes by one sixty-fourth. Thus, the output $V_0$ in relationship to the inputs $V_{1a}$ and $V_{1b}$ is increased or decreased depending upon the binary signal received at the input terminals 29—38. Also, the decrease or increase is in equal increments as the value of the binary number from the counter 39 changes in successive steps responsive to the change in count of the counter. Assuming a six-bit binary number and the six stages, the change per count is one sixty-fourth. It may be pointed out at this point that as previously mentioned, in using field effect transistors for the control switches it is desirable to maintain the input potential below the manufacturer specified knee value. The knee value depends on the characteristics of the transistor. Accordingly, the previously mentioned attenuator comprising the resistors 23, 25 and 23′, 25′ provide an attenuation of the signals $V_{1a}$ and $V_{1b}$ to the attenuators. For example, the ratio of the value of the resistors 23 to 25 and 23′ to 25′ may be in the order of 10:1.

The field effect transistors 43 are switched on or off responsive to the voltage on the gate from the associated driver. For example, with one common field effect transistor when the voltage is zero, the sink to drain resistance is in the order of 1 megohm and when the voltage is −12 volts the resistance is approximately 250 ohms.

FIG. 3 illustrates an attenuator driver of which there are six for providing the voltage "on-off" signal swing, e.g. 0 to −12 volts, to drive the field effect transistors 43. Each driver consists of a complementary network such that when it is providing the associated transistor of attenuator 27 with an "off" drive signal for nonconduction, e.g. 0 volts, it is providing the complementary stage of the attenuator 27′ with an "on" drive signal for conduction, e.g. −12 volts, and vice versa. The attenuator drivers each comprise an input terminal means 51 extending to an associated output of the counter 39. The driver network has output terminal means 53 and 55. The terminal means 53 is common to the input of an associated stage in the attenuator network 27 and the output terminal means 55 is common to the input of the complementary associated stage in the attenuator network 27′. The input terminal 51 is common to the cathode of a Zener diode 57. The anode of the diode 57 extends through a resistance 59 to the base of a transistor 61. The resistor 59 is also common to a second resistance network 62 and 63 extending to the bias source $V_1$. The junction of the resistance 62 and 63 is common to a suppressing capacitor 65 extending to the ground reference. The emitter of transistor 61 is common to a diode 67, the cathode of which is common to the capacitor 65. The collector of the transistor 61 is common to the output terminal 55 and to a resistance 68 extending to the ground reference plane. The attenuator driver network includes a second transistor stage 71 the base of which is common to the collector of the transistor 61 through a resistance 73. The base of the transistor 71 also extends through a resistance 75 to the capacitor 65. The emitter of the transistor 71 extends through a diode 77 to the capacitor 65. The collector of the transistor 71 extends to a resistance 79 to the ground reference and to the output terminal 53.

In viewing the driver of FIG. 3 it may be noted that when the binary input signals at terminal 51 from the counter 39 are of zero value, the output at the terminal 55 is zero and the output at the terminal 53 is a negative potential dependent upon the value of $V_1$. Thus, the driver of FIG. 3 is such that when driving one field effect transistor of the attenuator network 27 "on" it is driving the associated field effect transistor of the attenuator network 27′ "off." When the input to the terminal 51 is of a positive value, the output at the terminal 55 is of the order of magnitude dependent on $V_1$ and the output of the terminal 53 is zero. The voltage change is accomplished by the zener diode 57 in conjunction with the transistors 61 and 71 which are connected in the form of a Schmitt trigger circuit.

The up-down counter of FIG. 4 is designed to count up from 000000 to 111111 and down from 111111 to 000000 following the regular binary code. Obviously, those skilled in the art will recognize that there are various circuit designs for such counters. The illustrated counter is constructed with NAND gates and bistable multivibrators in the form of six J-K flip-flops. The input terminal means to the counter 39 includes a terminal means for a clock signal $C_1$ for controlling the rate of count of the counter 39 and clock signal $C_2$ and $C_3$ which start the counter, i.e. unlock the counter from the all "0" or all "1" state. The input clock signal $C_1$ is received by a NAND gate 80 and the clock signals $C_2$ and $C_3$ by a NAND gate 82. The output of the NAND gate 82 is received by a plurality of J-K flip-flops 84, 86, 88, 90, 92 and 93. It may be noted that the number of flip-flops is equivalent to the number of bits per binary signal. The NAND gate 80 is also tied to an OR junction 94 which in turn is tied to a pair of NAND gates 96 and 98. As will hereinafter be further discussed, the NAND gates 96 and 98 may not be common to an up-down counter but provide an additional feature. The NAND gate 96 has six input terminals each tied to the 0 terminal of one of the flip-flops 84—93. The NAND gate 98 has six input terminals each tied to the $\overline{Q}$ terminal of one of the flip-flops 84—93. The NAND gates 96 and 98 with the OR junction 94 in combination provide an inhibiting means such that the general clock pulses $C_1$ to the NAND gate 80 are inhibited when the counter 39 is either 000000 or 111111. Thus, when the counter 39 reaches either extreme, it stops. The counter is started by a $C_2$ $C_3$ pulse from the control logic network 41. Such a signal upsets the all "0" or all "1" state so that the counter starts its count.

The J-K terminals of the flip-flop 84 are tied in common to a bias source V which is of a value representative of a binary "1." The Q terminal of the flip-flop 84 is tied to a NAND gate 100 which is also common to an input line R from which the command pulses from the control logic 41 are received. The $\overline{Q}$ terminal of the flip-flop 84 is tied to a NAND gate 102 which is also common to an input line F from which the forward command pulses from the control logic 41 are received. The output of the NAND gates 100 and 102 are received by an OR junction 104. The output of the OR junction 104 extends to the J-K terminals of the flip-flop 86 and to a NAND gate 106. The Q and $\overline{Q}$ terminals of the flip-flop 86 are respectively tied to a pair of NAND gates 108 and 110. The output of the NAND gates 108 and 110 extend to an OR junction 112, common to the input of the NAND gate 106. The output of the NAND gate 106 is received by an inverter 114 common to the J-K terminals of the flip-flop 88 and to a NAND gate 116. The output of the flip-flop 88 is common to a pair of NAND gates 118 and 120, the output of which is common to an OR junction 122. The output of the OR junction 122 is common to the input of the NAND gate 116. The output of the NAND gate 116 is common to an inverter 124 extending to the J-K terminals of the flip-flop 90 and input of the NAND gate 126. The output of the flip-flop 90 is tied to a pair of NAND gates 128 and 130 common to an OR junction 132. The OR junction 132 is common to the input of the NAND gate 126. The output of the NAND gate 126 is common to an inverter 134, the output of which is common to the J-K terminals of the flip-flop 92 and a NAND gate 135. The output of the flip-flop 92 is tied to a pair of NAND gates 136 and 137 common to an OR junction 138. The OR junction 138 is common to the input of the NAND gate 135. The output of the gate 135 extends to an inverter 139 tied to the J-K terminals of the flip-flop 93. The $\overline{Q}$ terminal of the flip-flop 84 is also common to an inverter 140 extending to the input of the attenuator driver 29. The $\overline{Q}$ terminal of the flip-flop 86 extends to an inverter 141 extending to the attenuator driver 31, the $\overline{Q}$ terminal of the flip-flop 88 extends to an inverter 142 extending to the attenuator driver 33, the $\overline{Q}$ terminal of the flip-flop 90 extends to an inverter 143 extending to the attenuator driver 35, $\overline{Q}$ terminal of the flip-flop 93 extends to an inverter 144 extending to the attenuator driver 37 and the $\overline{Q}$ terminal of the flip-flop 93 extends to an inverter 145 extending to the attenuator driver 38. The flip-flops 84, 86, 88, 90, 92 and 93 also receive set "0" and "1" pulses from the control logic network 41. It may also be pointed out here that if the output signals from the counter 39 representative of binary "0" and "1" are of sufficient magnitude to drive the switches of the attenuators 27 and 27', the attenuator driver networks 29—38 may be omitted.

Figure 5:
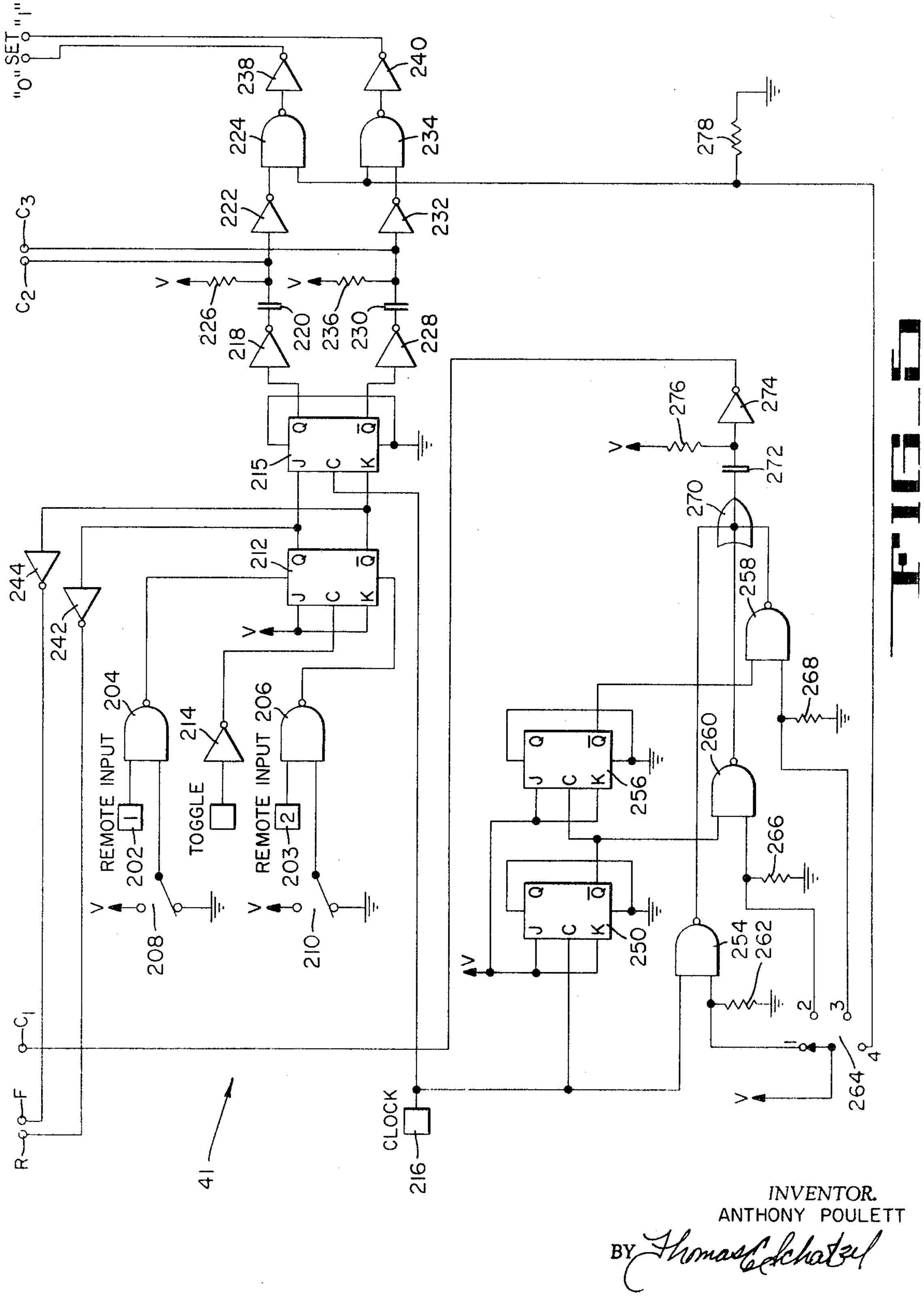
FIG. 5 is a schematic diagram of control logic for the dissolver network of FIG. 1.

FIG. 5 illustrates a control logic network 41 which may be incorporated for controlling activation of the up-down counter 39. As previously mentioned, the present invention lends itself to remote control. The remote control signals may be in the form of pulse signals generated or received at remote control inputs 202 and 203. The inputs 202 and 203 are respectively common to a pair of NAND gates 204 and 206. The input of the NAND gates 204 and 206 also extends to a pair of switches 208 and 210 normally at "0" or ground potential. The gates 204 and 206 set a J-K flip-flop 212. The J and K input terminals of the flip-flop 212 are common to a bias source V at binary "1" potential. The clock signal to the flip-flop 212 is received from an inverter 214 having an input terminal designated TOGGLE input. The output of the flip-flop 212 is common to the J and K terminals of a flip-flop 215. The clock signal to the flip-flop 215 originates with an external clock source tied to a clock terminal input 216. The output of the flip-flop 215 is such that the Q output terminal is fed through an inverter 218, a capacitor 220, another inverter 222, the input of a NAND gate 224 and an inverter 238 to the "0" set terminal. The capacitor 220 is also common to a resistance 226 extending to the bias source V. The $\overline{Q}$ terminal of the flip-flop 215 extends to an inverter 228, a capacitor 230, an inverter 232, a NAND gate 234, and an inverter 240 to the "1" set terminal. The capacitor 230 is also common to a resistance 236 extending to the bias source V. It may also be noted that the input of the inverter 222 is common to the clock terminal $C_2$ and the input of the inverter 232 is common to the clock terminal $C_3$ extending to the counter 39. At the same time the output of the flip-flop 212 extends through inverters 242 and 244 to the respective terminals F and R of the counter 39.

The control logic network 41 further includes a flip-flop 250 tied to the clock terminal 216 for receiving an external clock signal. The clock terminal 216 is also common to a NAND gate 254. The J and K input terminals of the flip-flop 250 are common to the binary "1" bias potential source V. The $\overline{Q}$ output of the flip-flop 250 is common to the clock input terminal of a flip-flop 256. The J and K terminals of the flip-flop 256 are common to the source V. The $\overline{Q}$ output of the flip-flop 256 extends to a NAND gate 258. The output of the flip-flop 250 also extends to a NAND gate 260. The other input terminal of the NAND gate 254 extends to the ground reference through a resistance 262 and to a four position switcher 264. As illustrated the NAND gate 254 is connected to position 1 of the switcher 264 the wiper of which is at the V potential. The NAND gate 260 also has an input terminal extending to ground through a resistance 266 and to position 2 of the switcher 264. The NAND gate 258 has an input signal extending to ground through a resistance 268 and to position 3 of the switcher 264. The output of the NAND gates 254, 258, 260 all feed into an OR junction 270. The output of the OR junction 270 extends through a capacitor 272 to an inverter 274. The input of the inverter 274 extends through a resistance 276 to the bias potential V. The output of the inverter 274 is common to the $C_1$ terminal of the counter 39. Position 4 of the switcher 264 extends to the input of the NAND gates 224 and 234 and to ground through a resistance 278.

As previously mentioned, the general clock pulse $C_1$ attempting to pass through the NAND gate 80 and 92 of the counter 39 is inhibited by the NAND gates 96 and 98 when the binary counter 39 is either at 000000 or 111111. Thus, when the counter 39 reaches either extreme of its count, it stops. The control logic network 41 is so arranged that it starts or restarts the counter 39 by a pulse provided to either of the other input terminals $C_2$ and $C_3$ common to the gate 82. The starting pulse will be derived from a digital pulse at either the remote input positions 202 and 203 or by switching one of the remote input switches 208 and 210 to the binary "1" position. More explicitly, if a pulse is applied to the input 202 or the switch 208 is momentarily closed, the flip-flop 212 is set and provides a positive output pulse. Through the connection to the inverter 242 and terminal R this puts the counter 39 in reverse. At the next clock pulse a pulse will appear at the output of the flip-flop 215. This is differentiated by the arrangement of the differentiator comprising the capacitor 220 and resistor 226. The differentiated signal is fed to the terminal $C_2$ common to the gate 82. This signal is synchronized with the clock signal from the terminal 216. This starts the counter counting from the all "1" state to the all "0" state. When the counter reaches the all "0" state it stops due to the inhibiting feature provided by the NAND gates 96 and 98. A positive pulse from the switch 210 or a signal at the remote input terminal 203 will start the counter to count in the opposite direction. A pulse into the TOGGLE input will cause the counter 39 to first count in one direction; a second pulse will cause it to count in the opposite direction; a third pulse would cause it to count in the original direction and so on. Thus, this is the equivalent to alternately switching the switches 208 and 210 or providing signals alternately at the positions 202 and 203. Depending upon the count of the counter 39, signals appear at the output of the inverters 140—145 to their respective attenuator drivers 29, 31, 33, 35, 37 and 38 as illustrated in FIG. 3. The attenuator drivers in turn control the switches of the attenuator networks 27 and 27′. Assuming an attenuator 27 or 27′ is in the all "1" state, the most significant stage of the counter 39 switches the field effect transistor 43 with the smallest resistor, i.e. R. The next most significant count switches the next most significant stage of the attenuator network 27, i.e. 3R. When the counter 39 is in the all "0" state attenuator 27 is fully off and attenuator 27′ fully on. As the counter 39 counts, more of the signal $V_{1a}$ is allowed to pass and less of the signal $V_{1b}$. The clock pulse that switches the counter 39 is selected to occur during the television vertical interval and therefore amplitude changes will take place during this time. Each clock pulse will cause one sixty-fourth more of one input $V_{1a}$ and one sixty-fourth less of the input $V_{1b}$ to appear at the output as the counter counts. Therefore, a dissolve from $V_{1b}$ to $V_{1a}$ is accomplished as the counter counts forward from the all "0" state to the all "1" state. The clock pulse rate controls the rate of the dissolve.

The rate of dissolve is controlled by the flip-flops 250 and 256 along with the switching network 264. The flip-flops 250 and 256 are connected as a ripple-through counter controlled from the clock pulse input 216. This clock pulse may occur during each vertical interval and be synchronized with the vertical sync signals. If the switch 264 is in position 1, this clock pulse is fed through the gate 254 to the clock terminal $C_1$ of the counter 39. The counter 39 is then clocked in accord with the clock rate at terminal 216. If the switch network 264 is in position 2, half as many pulses pass through gate 260 since the gate 260 is also tied to the flip-flop 250 and if in position 3, one-fourth as switch such that the dissolve pass since gate 258 is tied to the flip-flop 256. Thus, the dissolve rate is reduced by one-half or one-fourth when switch 264 is in position 2 or 3, respectively. The pulses through the OR junction 270 are differentiated prior to being fed to the counter 39. If the switch 264 is in position 4, the counter 39 will not count but switches from the all "0" state or the all "1" state or vice versa depending on the command from the switches 208, 210 or the remote inputs 200, 202. The dissolver then acts as at vertical interval switch such that the dissolve rate is "cut." Also, it is to be understood that the clock source is not limited to the sync source but may be a source at a rate exceeding the vertical sync rate. For example, the clock rate may be such that during the vertical sync interval a multiple of clock pulses are provided at terminal 216. Then, the dissolve rate will exceed that of the vertical sync pulse rate. It is desirable so as not to interfere with the picture that the clock pulses to the counter occur during the vertical interval and not during a horizontal line. Thus, the clock pulse, whether the rate be equal to, exceed or be less than the vertical sync rate, should be responsive to the vertical sync pulse.

I claim:

1. A video signal dissolver network comprising, in combination:

first input terminal means for receiving a first video input signal;

second input terminal means for receiving a second video input signal output terminal means;

a first attenuator network intermediate said first input terminal means and said output terminal means, the first attenuator network having selectable preset discrete degrees of attenuation, the discrete degree of attenuation selected in response to electrical drive signals;

a second attenuator network intermediate said second input terminal means and said output terminal means, the second attenuator network having selectable preset discrete degrees of attenuation, the discrete degree of attenuation selected in response to electrical drive signals;

drive means extending to the first and second attenuator networks for providing said electrical drive signals; and means responsive to a clock signal to command the drive means to change the electrical drive signals provided thereby at intervals determined by the clock signal and thereby change the attenuation of each of the attenuator networks from one discrete degree of attenuation to another different discrete degree of attenuation.

2. The network of claim 1 including means for coupling to the command means a signal obtained in response to the vertical sync rate of the video input signal the obtained signal serving as the clock signal.

3. The network of claim 2 in which the command means is a counter means having an input for receiving the clock signal and counting at a rate in accord with the clock signal, the drive means is responsive to the count of the counter to provide the electrical drive signals.

4. The network of claim 3 including switches means for varying the clocking rate of said counter.

5. The network of claim 1 in which the first and second attenuator networks each has a plurality of individual attenuation paths, each path of which has a particular attenuation, each attenuator network responsive to the drive signals to complete certain paths through the attenuator network and provide the selected degree of attenuation.

6. The network of claim 5 in which the command means is a counter means having an input for receiving the clock signal and counting at a rate in accord with the clock signal, the drive means is responsive to the count of the counter to provide the electrical drive signals.

7. The network of claim 6 in which the counter means is a binary counter, and the binary count of the counter is in the form of a binary number of a certain number of bits, the number of individual paths of each attenuator network is equivalent to the number of bits forming the binary number received by the drive means.

8. The network of claim 6 in which the counter means is an up-down binary counter, the drive means is responsive to the binary count of the counter.

9. The network of claim 8 in which the degree of attenuation of the first attenuator network is substantially the complement of the degree of attenuation of the second attenuator network.

10. The network of claim 9 in which each path in each attenuator network includes a control switch having conductive and nonconductive states, the drive means provides first and second electrical drive signals to each control switch, the control switch is responsive to the first drive signals to be set in the conductive state and complete the path in the attenuator network and is responsive to the second drive signals to be set in the nonconductive state and inhibit the path in the attenuator network.

11. The network of claim 9 in which the drive means provides to each attenuator network a number of "on-off" drive signals, the number of "on-off" signals equaling the number of individual paths.

12. The network of claim 11 in which each path of the first attenuator network has an associated path of equal attenuation in the second attenuator network.

13. The network of claim 12 in which the attenuation of the individual paths are of values which in combination allow for a change in the net attenuation by equal incremental amounts responsive to the incremental up or down count of said counter.

14. The network of claim 13 in which the control switches in the first and second attenuator networks are field effect transistors assuming conductive and nonconductive states responsive to the received first and second drive signals respectively.

15. The network of claim 14 in which the electrical potential value of the drive signals are at a value less than the knee potential of the transistors.

16. The network of claim 15 in which the drive means provides the first drive signal to selected ones of the field effect transistors of each associated pair to drive the selected ones to the conductive state while providing the second drive signal to the other to drive the remaining ones to the nonconductive state.

17. The network of claim 16 further including means responsive to a pulse to command said counter to start counting.

18. The network of claim 17 further including means for setting said counter selectively in one of either the all "0" or the all "1" states prior to the counter starting its count.

19. The network of claim 18 in which said counter automatically counts to the all "1" state once started from the all "0" state and to the all "0" state once started from the all "1" state, and the counter is responsive to the received clock signal to count at a rate of the clock signal rate.

20. The network of claim 19 further including inhibit means for stopping said counter when said counter is in the all "0" or all "1" state.

21. The network of claim 20 further including control logic means for providing start pulses to said binary counter.

22. The network of claim 21 in which the control logic means provides on selective command one of either a reverse start pulse and forward start pulse to said binary counter means.

23. The network of claim 21 in which the control logic means provides the start pulses in response to remotely generated pulses received at the control logic.